United States Patent [19]

Hamanaka et al.

[11] 4,205,355
[45] May 27, 1980

[54] FLEXIBLE DISK DRIVE APPARATUS

[75] Inventors: Kunio Hamanaka, Tokyo; Yoshiki Sakurai, Oume, both of Japan

[73] Assignee: Tokyo Shibaura Denki Kabushiki Kaisha, Japan

[21] Appl. No.: 950,721

[22] Filed: Oct. 12, 1978

[30] Foreign Application Priority Data

Oct. 19, 1977 [JP] Japan ............................... 52-124571

[51] Int. Cl.² .............................................. G11B 5/06
[52] U.S. Cl. ...................................................... 360/99
[58] Field of Search ...................................... 360/99, 97

[56] References Cited
U.S. PATENT DOCUMENTS 3,890,643  6/1975  Dalziez ................................. 360/99

Primary Examiner—Robert S. Tupper
Attorney, Agent, or Firm—Finnegan, Henderson, Farabow, Garrett & Dunner

[57] ABSTRACT

Disclosed is a flexible disk drive apparatus which is so formed that a flexible disk cartridge drives a pop-up arm urged in the direction opposite to the cartridge inserting direction when the cartridge is inserted in the apparatus with doors open; the pop-up arm is latched to a main frame of the apparatus after the cartridge has reached a predetermined working position, while the pop-up arm and cartridge are forced out toward the doors by the urging force before the cartridge reaches the working position.

14 Claims, 7 Drawing Figures

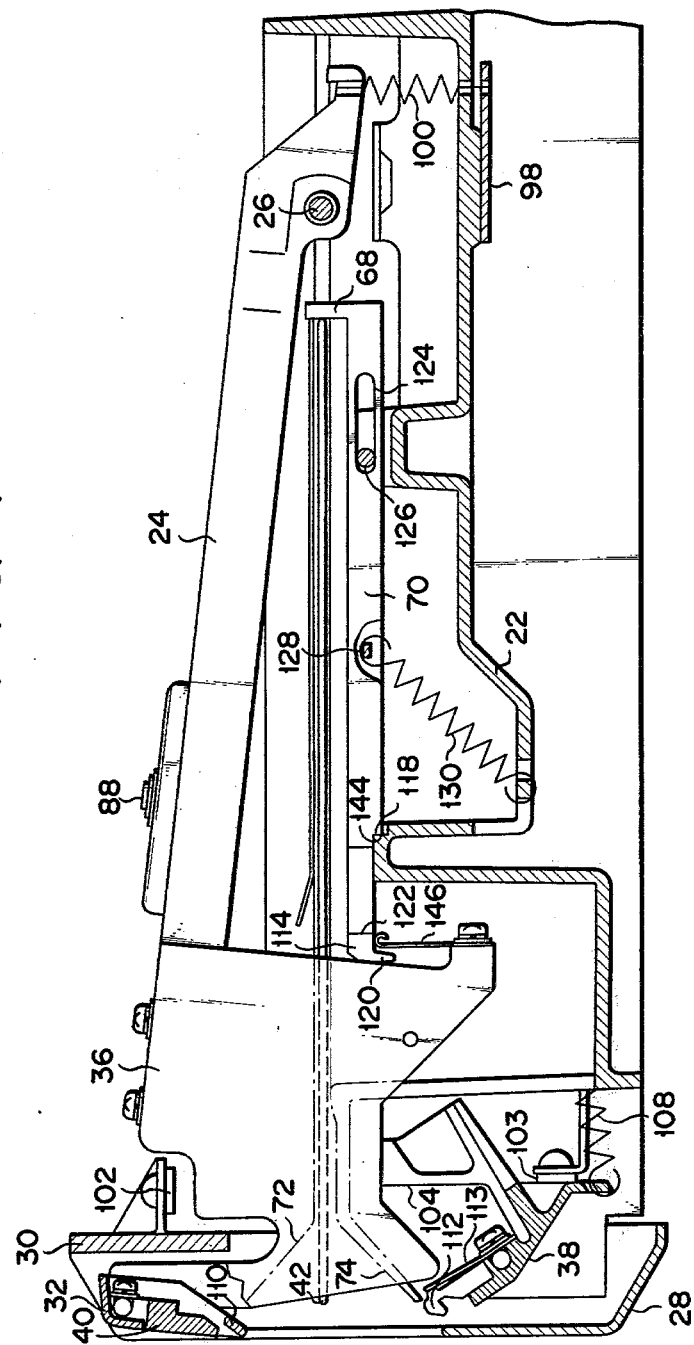

FLEXIBLE DISK DRIVE APPARATUS

BACKGROUND OF THE INVENTION

This invention relates to a magnetic recording and/or reproducing apparatus, and more particularly to a flexible disk drive apparatus which has the function of receiving a flexible disk cartridge equipped with a flexible magnetic disk, exactly positioning the cartridge with respect to a disk drive means, and thereafter ejecting as required the cartridge exteriorly of the apparatus.

A flexible disk cartridge having a plastic jacket in which a flexible magnetic disk is received is becoming a very popular magnetic recording medium. A flexible disk drive apparatus having such cartridge received therein to effect recording and/or reproducing of information into and/or from a disk in the cartridge usually includes a disk drive means, a read/write head, and a door for permitting reception of the cartridge into the apparatus. The cartridge is inserted into the apparatus during the period of time in which the door is opened, and as the door is closed, is coupled to the disk drive means.

In this type of apparatus, closing the door before completion of the cartridge insertion up to its operable position causes an abnormal contact of the disk with the drive means to cause damages to the disk. To prevent such damage to the disk, it is preferable to provide an ejector means which, unless the cartridge is completely inserted into the apparatus, urges the cartridge in a direction in which it is ejected exteriorly of the apparatus, thereby to let the operator know that the cartridge is not completely inserted. Also, such ejector means is advantageous in removing the cartridge out of the apparatus.

The flexible disk drive apparatus, however, is needed to satisfy two reciprocal requirements. Namely, after the cartridge is fully inserted up to its operable position, it must not be ejected by the ejector means before the door is closed. The other requirement is that simultaneously with opening of the door.

Some prior art apparatus includes an ejector means movable between a group of two cocked positions and a released position in order to meet said two reciprocal requirements. This ejector means is moved from the released position to a first one of the cocked positions when the cartridge is inserted, and as the door is subsequently closed is moved from the first cocked position to a second one tion to a second one. As the door is again opened, the ejector means is moved from the second cocked position back to the released position to eject the cartridge exteriorly of the apparatus.

Said prior art apparatus including such ejector means is generally complicated in structure and in addition is required to have a separate means for permitting exact matching of the cartridge with the drive means, thereby to prevent displacement of the cartridge to an unexpected position which when the door is closed occurs as the ejector means is moved from the first cocked position to the second one.

SUMMARY OF THE INVENTION

It is accordingly a principal object of the invention to provide a flexible disk drive apparatus including an ejector means which until completion of the cartridge insertion up to its operable position urges the cartridge outwardly of the apparatus to let the operator know that the cartridge has not been completely inserted.

It is another object of the invention to provide a flexible disk drive apparatus including an ejector means which can be moved from a single cocked position to a released position and vice versa to permit exact matching, in the cocked position, of a disk in the cartridge with the drive means.

It is a further object of the invention to provide a flexible disk drive apparatus including an ejector means which acts to eject the previously inserted cartridge exteriorly of the apparatus simultaneously with opening of the door.

In order to attain the above object, the flexible disk drive apparatus of this invention in which a flexible magnetic disk is inserted, whereby information is recorded in and/or reproduced from the disk, comprises a main frame, disk driving means attached to the main frame, a subframe attached to the main frame for movement between a disk driving position and a cartridge inserting position, selective clamp means on the subframe and operable to engage the disk driving means when the subframe is in the disk driving postion, the clamp means being spaced from the disk driving means when the subframe is in the cartridge inserting position, ejector means for ejecting the cartridge from the drive apparatus, the ejector means engaging one edge of the cartridge and movable from a released position to a cocked position to be latched in the cocked position as the cartridge is inserted into the drive apparatus, and releasing means engageable with the ejector means upon movement of the subframe from the disk driving position toward the cartridge inserting position to release the ejector means from its latched state, whereby the ejector means moves from the cocked position to the released position to eject the cartridge as the subframe moves from the disk driving position to the cartridge inserting position, the releasing means allowing the ejector means to be latched again in the cocked position in response to the insertion of the cartridge after the subframe has reached the cartridge inserting position.

By using the flexible disk apparatus with the aforementioned construction, the disk may be protected from damage as follows. When the subframe is opened to the cartridge inserting position, thereby forming a cartridge passage, and the cartridge is inserted into such passage, the cartridge pushes and shifts the ejector means. When shifted to a predetermined position, the ejector means is latched to the main frame. Such position of the ejector means is called the cocked position, and the position of the cartridge at this time is called the operable position or working position. The disk contained in the cartridge held in this position is correctly connected to the disk driving means when the subframe is shifted to the disk driving position or closed position. That is, the cartridge is correctly located in the apparatus. Thus, the subframe may be shifted to the closed position for the start of the apparatus. However, if the cartridge is not inserted fully into the working position, the ejector means will not be latched but will be pushed to the released position in the direction opposite to the inserting direction by the urging force thereon. Accordingly, realizing that the cartridge is not correctly inserted, the operator can refrain from closing the subframe for starting the operation in that state. The position of the cartridge in this state is to be referred to as outside position. In taking out the disk in the working position, as aforesaid, from the apparatus, after stopping the apparatus, the ejector means may be released from the latched state through the action of the releasing means moving with the subframe by shifting again the subframe to the cartridge inserting position, whereby the cartridge is forced out to the outside position. Thus, the cartridge may easily be taken out.

BRIEF DESCRIPTION OF THE DRAWINGS

FIG. 7 shows a state following the state of FIG. 6 in which the subframe is shifted to the open state and the pop-up arm is going to be forced up by the releasing means.

DETAILED DESCRIPTION OF THE PREFERRED EMBODIMENT

Figure 1:
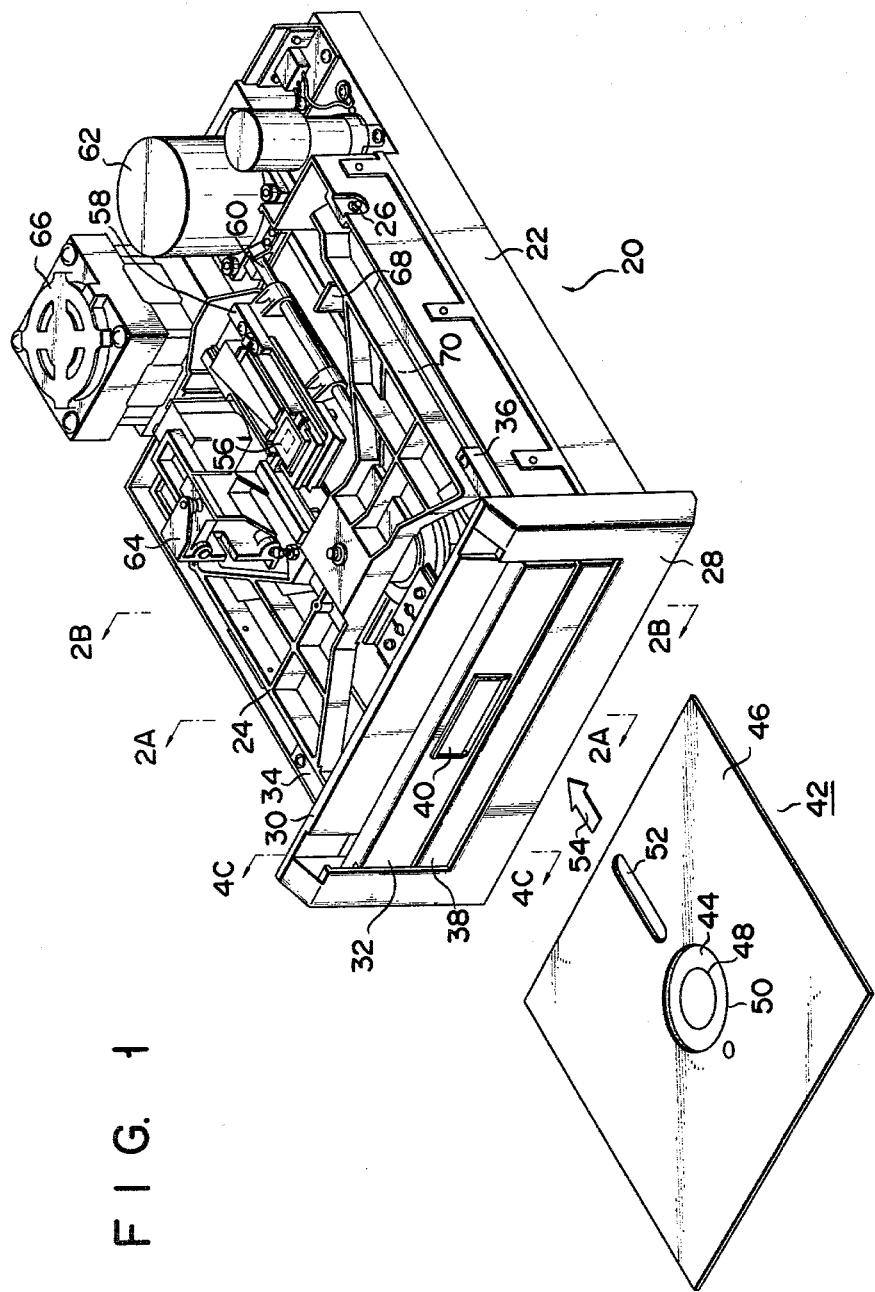
FIG. 1 is a perspective view of the flexible disk drive apparatus with its cover removed therefrom, showing the arrangement of the internal mechanisms.

Now there will be described an embodiment of the flexible disk drive apparatus of this invention. In FIG. 1, numeral 20 designates the flexible disk drive apparatus of the invention. A main frame 22 and a subframe 24 are so formed as to be able to swing round shafts 26. The shafts 26 are provided on each side of the main frame 22, though only one of them is shown in FIG. 1. Attached in front of the main frame 22 are lower and upper front panels 28 and 30.

An upper door 32, which is attached to arms 34 and 36 fixed to the main frame 22, turns round the shafts 26 interlocking with the subframe 24. A lower door 38, which is pivotally mounted on the subframe 24, turns engagedly with the upper door 32. In FIG. 1, both the upper and lower doors 32 and 38 are closed, and the subframe 24 is turned so as to take its nearest position to the main frame 22. When the subframe 24 (urged clockwise as illustrated) turns in a direction away from the main frame 22, the upper and lower doors 32 and 38 turn upward (clockwise) and downward (counterclockwise), respectively, to take an open position. When a push button 40 is depressed, the doors 32 and 38, which have been latched to a closed position as mentioned later, are released from the latched state and move to an open position. A flexible disk cartridge 42 is composed of a flexible magnetic disk 44 and a jacket 46 in which the disk 44 is inserted. The disk 44 has a center hole 48, while the jacket 46 has a center hole 50 with a diameter a little larger than that of the center hole 48 and a head access window 52. One or both sides of the disk 44 are provided with concentric data tracks, along which data are recorded in series. Such recording and/or reproducing are performed through the head access window 52. The cartridge 42 is inserted from the front to back of the apparatus 20, in the direction of the arrow 54 of FIG. 1, through a space between the two doors 32 and 38 when the subframe 24 has turned to the farthest position from the main frame 22 to open the doors 32 and 38.

In FIG. 1, a carriage assembly 58 fitted with a magnetic head 56 may be moved in the radial direction of the disk 44, guided by guide rails 60 fixed to the main frame 22. Accordingly, the magnetic head 56 is also moved to a desired data track position in the radial direction of the disk 44, so that it may execute recording and/or reproducing of the disk 44 through the head access window 52. A stepping motor 62, which is used for moving the carriage assembly 58, is connected with the carriage assembly 58 by means of a lead screw, steel belt or any other conventional means. Numeral 64 denotes a head load mechanism which presses the magnetic head 56 against the surface of the disk 44 only during the recording and/or reproducing of data in and from the disk 44. Numeral 66 designates an electric motor such as an induction motor for rotating the disk 44, while 68 designates a projection on a pop-up arm 70 mentioned later as an example of eject means or eject member.

Figure 2:
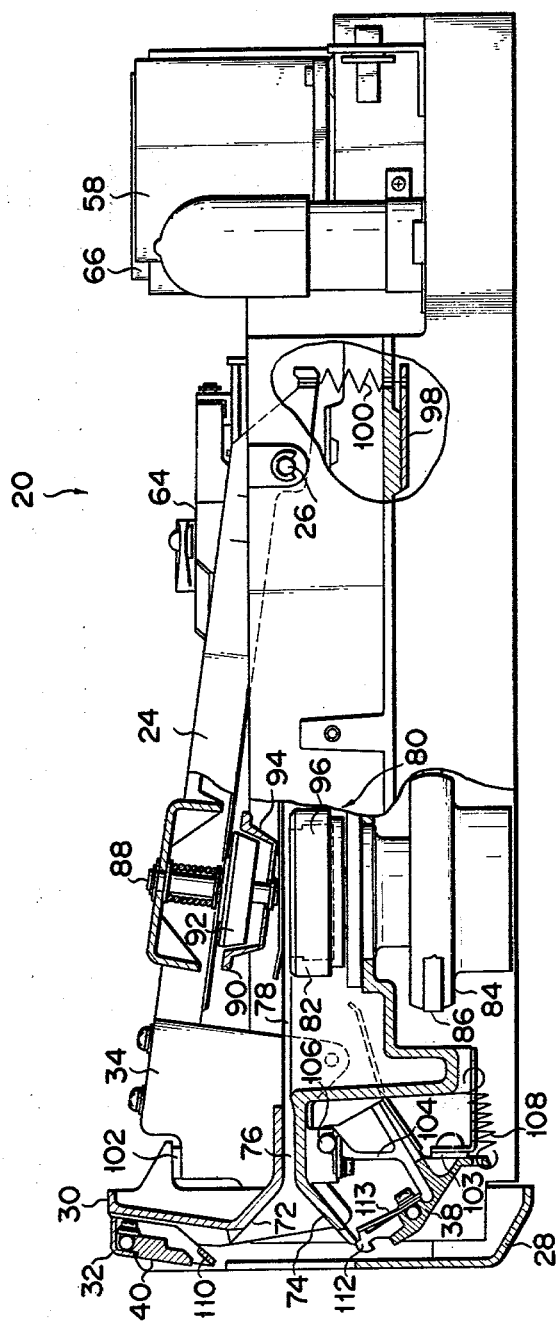
FIG. 2 is a side view of the apparatus of FIG. 1 chiefly showing the construction of the main frame and subframe and other related members out of the mechanisms of FIG. 1, in which the approximate forward half of the drawing is a sectional view as taken along line 2A—2A of FIG. 1, while the substantially circular partial sectional view in the rear half is taken along line 2B—2B of FIG. 1.

FIG. 2 is a side view of the flexible disk drive apparatus 20 shown in FIG. 1, in which the approximate forward or left-hand half of the drawing is a sectional view as taken along line 2A—2A of FIG. 1, while the substantially circular partial sectional view in the real half is taken along line 2B—2B of FIG. 1. FIG. 2 shows a state in which the subframe 24 is turned clockwise round the shafts 26 to its full to be removed farthest from the main frame 22, thereby opening the doors 32 and 38. The position of the subframe 24 in this state is to be referred to as the open position, as aforesaid, or cartridge inserting position. The door 32 is attached to the left-hand end of the subframe 24 as illustrated. Upper and lower guide surfaces 72 and 74 are provided for the upper front panel 30 and the main frame 22, respectively. Between the two guide surfaces 72 and 74 is an opening 76 tapering away toward the left-hand side, through which the cartridge 42 inserted into the apparatus 20 from the left is thrusted into a cartridge passage 78.

On the top end of a spindle 80 is a spindle hub 82 which is rotated by the induction motor 66 (FIG. 1) by means of a belt 86 passed round a fly wheel 84. A shaft 88 is fitted in the subframe 24, a hub clamp 90 and an expander 92 being attached to the shaft 88. When the subframe 24 is turned to a position far enough from the main frame 22 to open the doors 32 and 38 to their full width, a gap will be formed between the spindle hub 82 and the hub clamp 90, so that the cartridge 8 inserted through the opening 76 will be allowed to advance into the cartridge passage 78 without hindrance. When the subframe 24 is turned to the position nearest to the main frame 22 (referred to as the closed position or disk driving position of the subframe 24) to close the doors 32 and 38, the spindle hub 82, flywheel 84, hub clamp 90, expander 92 and the shaft 88 are coaxially arranged in a beeline. Thereupon, a conical projection 94 of the hub clamp 90 enters the spindle hub 82. Therefore, if the cartridge 42 is then inserted in place, the projection 94 will enter a recess 96 in the spindle hub 82 through the center hole 48 of the disk 44, so that the disk 44 will rotate in concert with the spindle hub 82, held between the spindle hub 82 and the hub clamp 90 coaxially with the spindle hub 82. Since the expander 92 is well-known in the art, detailed description thereof is omitted herein.

As shown in the partial section in the right-hand half of the drawing of FIG. 2, a spring support member 98 is attached to the main frame 22, and a coil spring 100 is stretched between the member 98 and the right or rear end of the subframe 24. Accordingly, the subframe 24 is always urged away from the main frame 22, that is, to turn clockwise as illustrate to the open position. Behind the upper front panel 30 is a stopper 102 for regulating the turning of the subframe 24.

Integrally formed on the lower door 38 is an arm 104, which is pivotally mounted on the main fram 22 by means of a shaft 106. Motion of the subframe 24 is transmitted to the arm 104 by means of a suitable link mechanism (not shown). When the subframe 24 comes close to the main frame 11, the lower door 38 will turn upward. On the other hand, when the subframe 24 is removed from the main frame 22, the lower door 38 will be turned downward by the action of a coil spring 108 connecting the main frame 22 with the lower door 38, and will stop where it is brought in contact with a stopper 103 on the main frame 22.

The upper and lower doors 32 and 38 are provided with an engaging portion 110 and a latch 112, respectively. When the two doors 32 and 38 approach each other, the latch 112 pivotally mounted on the lower door 38 and urged by a leaf spring 113 attached to the lower door 38 is pushed to rotate counterlockwise as illustrated and engage the engaging portion 110, thereby latching the doors 32 and 38. Accordingly, the closed state of the doors 32 and 38 is maintained although the subframe 24 is urged in the clockwise direction as seen in FIG. 2. At this time, when the push-button 40 on the upper door 32 is depressed, the latch 112 is pushed by the button 40 to turn clockwise and comes off the engaging portion 110, thereby opening the doors 32 and 38 by means of the action of the coil springs 108 and 100 and turning the subframe 24 clockwise or upward.

Figure 3:
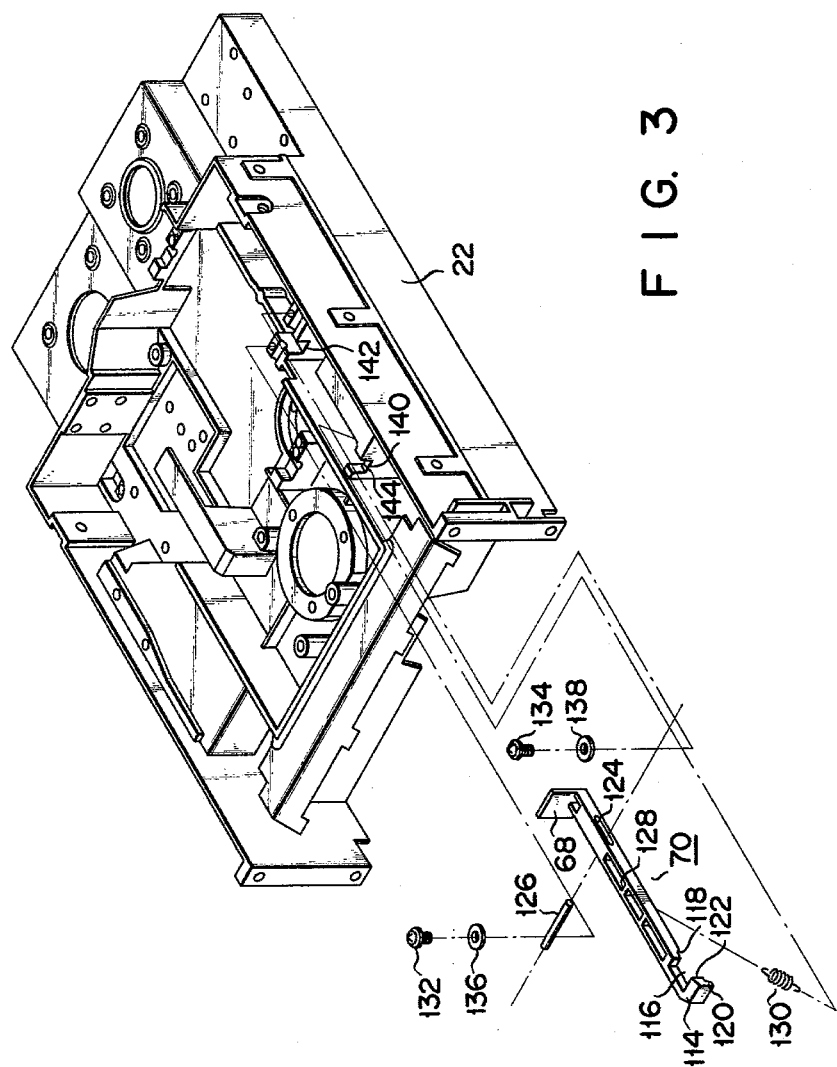
FIG. 3 is a perspective view showing the relative position of the main frame and the pop-up arm.
Figure 4:
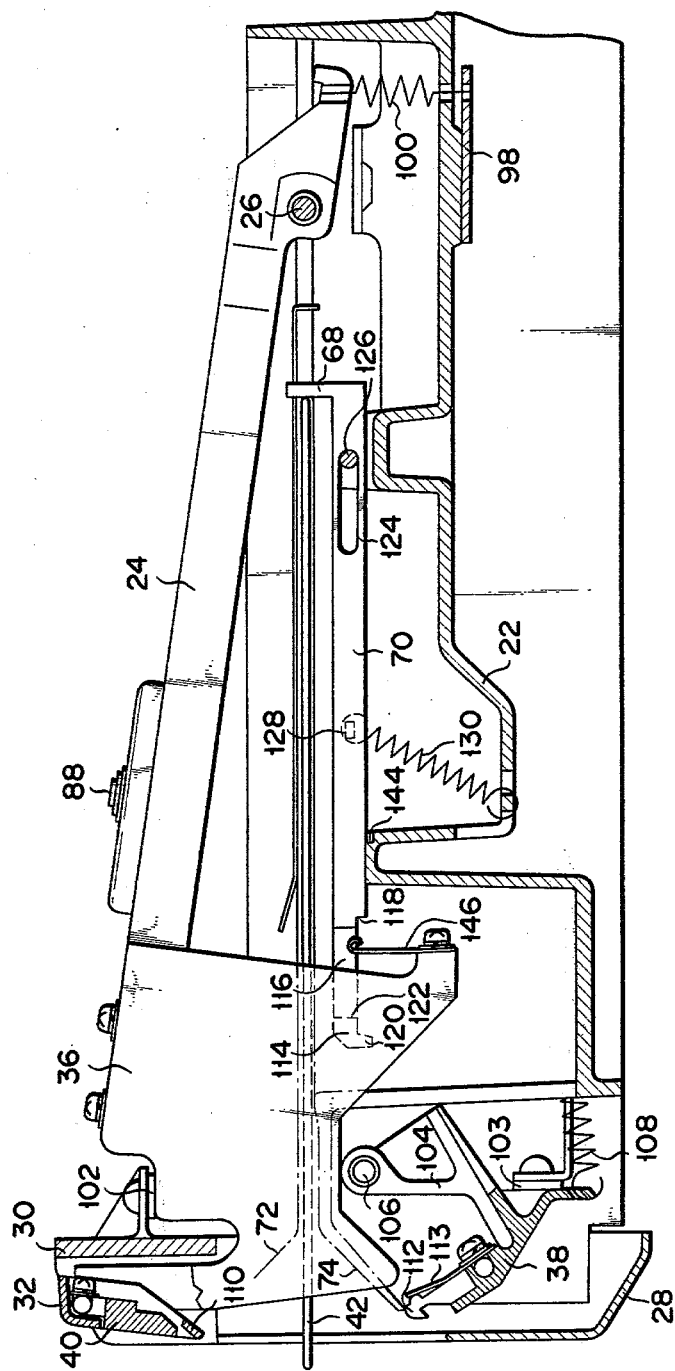
FIG. 4 shows how the cartridge is inserted into the apparatus and starts to push the pop-up arm in the released position; the door portion, pop-up arm portion and front panel portion are given by sectional views as taken along lines 2A—2A, 2B—2B and 4C—4C of FIG. 1, respectively.

FIG. 3 shows the shape of the pop-up arm 70 with the projection 68 as shown in FIG. 1 and how the arm 70 is attached to the main frame 22. The pop-up arm 70 is substantially a square bar in shape, extending long in the longitudinal direction of the apparatus. At the forward end of the arm 70 are an arm end 114, a notched portion 116 adjacent thereto, and a first stepped portion 118 formed on the under side adjacent to the notched portion 116. A projection 120 is formed at the bottom of the forward end of the arm end 114, the back of which faces the notched portion 116 through a pressing surface or working wall 122. A slot 124 is bored sidways through the pop-up arm 70. A shaft 126 (see FIGS. 3 and 4) fixed to the main frame 22 is passed through the slot 124, whereby the pop-up arm 70 is allowed to move back and forth within the length of the slot 124. At the backward end of the pop-up arm 70 is the projection 68 to engage the forward end of the inserted cartridge 42. As shown in FIG. 4, the arm 70 as a whole is always urged forward by a coil spring 130 stretched between a coil spring holder 128 in the arm 70 and the main frame 22. Screws 132 and 134 and washers 136 and 138 of FIG. 3 are members for fixing the shaft 126 to the main frame 22. Formed in the main frame 22 are guide channels 140 and 142 (FIG. 3) whereby the pop-up arm 70 is guided and allowed to slide in the longitudinal direction. At the rear end of the guide channel 140 in the main frame 22 is a second stepped portion 144 (FIG. 4), which engages the first stepped portion 118 of the pop-up arm 70 to prevent the arm 70 from sliding forward when the cartridge 42 is inserted in place (FIG. 5).

Referring now to FIGS. 4 to 7, there will be described the operation of the apparatus of this invention. In FIG. 4, the subframe 24 is in the cartridge inserting position, and the cartridge 42, inserted between the upper and lower guide surfaces 72 and 74 into the cartridge passage 78, has its forward end hitting against the projection 68 of the pop-up arm 70, though the arm 70 is not pushed to the right, still remaining in the outside position. In this state, as illustrated, the left-hand end of the cartridge 42 is just out from between the doors 32 and 38 on the inserting side, and the cartridge 42 is not forced into the working position. Therefore, the doors 32 and 38 are open and engaged against the stoppers 102 and 103, respectively, while the pop-up arm 70, pulled to the left by the action of the coil spring 130, is positioned leftward with the right end of the slot 124 in contact with the shaft 126. This position is called a released position of the pop-up arm 70. Numeral 146 denotes a leaf spring protruding upward with one end fixed to the bottom end of the arm 36 attached to the subframe 24, and is operable to force the pop-up arm 70 up as forcing up the pop-up arm 70 as described hereinafter. In the state of FIG. 4, the leaf spring 146 extends substantially upright, freely projecting into the notched portion 116 of the pop-up arm 70.

Figure 5:
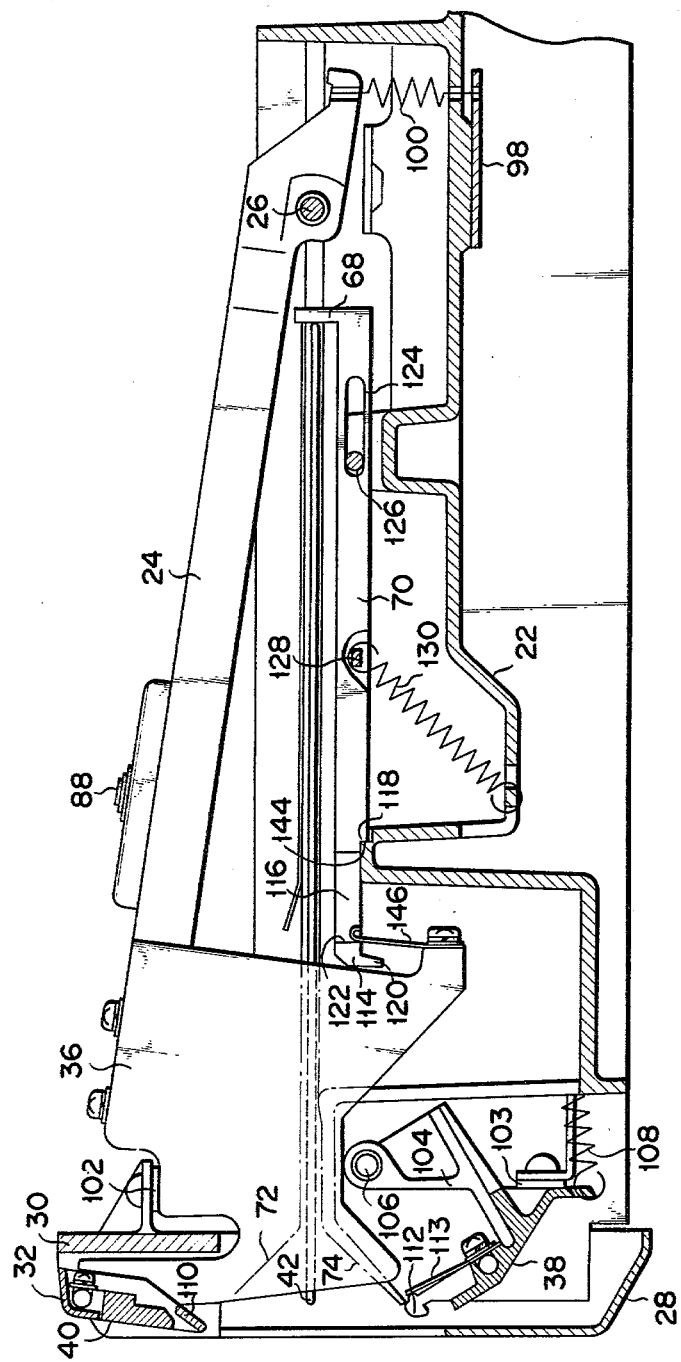
FIG. 5 shows a state in which the cartridge is further inserted and the pop-up arm is latched at the cocked position.

In FIG. 5, the cartridge 42 as shown in FIG. 4 is further pushed to the right, the pop-up arm 70 is moved to the right with the left end of the slot 124 in close vicinity to the shaft 126, and the doors 32 and 38 are still open although the insertion of the cartridge 42 has been completed. In this state, the coil spring 130 is stretched out as the arm 70 moves rightward, and the leaf spring 146 inclines to the right with its tip end pushed by the working wall 122 formed at the back of the arm end 114. Further, the first stepped portion 118 of the pop-up arm 70 is engaged with the second stepped portion 144 of the main frame 22, so that the pop-up arm 70 is stably coupled with the main frame 22, whereby the pop-up arm 70 will be prevented from moving to the left if it is pulled leftward by the extended coil spring 130. This position of the pop-up arm 70 is called a cocked position, and the position of the cartridge at this time is called a working position.

Figure 6:
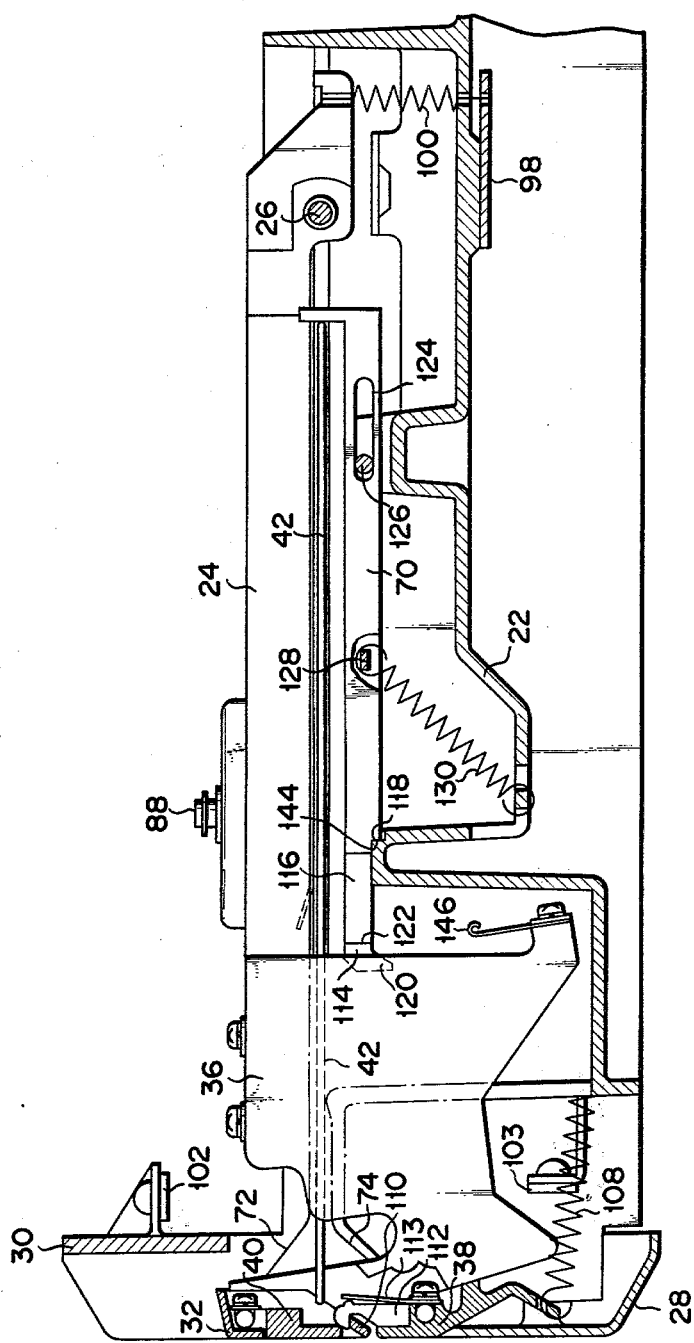
FIG. 6 shows a state following the state of FIG. 5 in which the subframe is shifted to the closed position and the doors are latched in the closed state.

FIG. 6 shows a state in which the doors 32 and 38 are closed after the insertion of the cartridge 42 is finished. At this time, the subframe 24 is located nearest to the main frame 22, thus the doors 32 and 38 are closed being prevented from opening by the engagement of the latch 112 and the engaging portion 110 on the upper door 38. Accompanying the turning of the subframe 24, the leaf spring 146 attached to the arm 36 is released from the engagement with the working wall 122 to move downward, returning to the substantially upright position by its elasticity. Thereupon, the disk 44 inserted in the cartridge 42 is held between the spindle hub 82 and the hub clamp 90, as aforesaid, to enter into the operating state.

In FIG. 7, showing a state following the state of FIG. 6, the push-button 40 is depressed to release the engaging portion 110 and the latch 112 from the latched state, and the leaf spring 146 is moved upward by a clockwise rotation of the subframe 24. While the doors 32 and 38 are opening, the tip end of the leaf spring 146 hits against the under surface of the arm end 114 of the pop-up arm 70 at the back of the projection 120 to press upwardly on the left-hand end portion of the pop-up arm 70. Thus, when the subframe 24 is further turned clockwise from such position, the left end of the pop-up arm 70 is thrusted up, the first and second stepped portions 118 and 144 are released from the latched state, and the pop-up arm 70 is moved to the left by a contraction of the coil spring 130. Consequently, the cartridge 42 is forced out to the left by the projection 68 of the arm 70, stopping with part of its left end jutting outside.

By using the embodiment of this invention described above, the following effects may be obtained. Unless correctly and fully inserted into the apparatus, the cartridge 42 will be forced out in the direction opposite to the inserting direction by the pop-up arm 70, so that the operator will be notified that the cartridge 42 is not correctly inserted. When the doors 32 and 38 are opened to provide an entrance for the cartridge 42, the subframe 24 interlocking with the doors is in the open position, whereby the cartridge 42 will be allowed to be inserted into the correct inside position without hindrance. Moreover, when the subframe 24 and hence the doors 32 and 38 are closed, the doors are automatically latched, and the doors and the subframe 24 will never open unless the push-button 40 is depressed. Thus, there will be no fear of the cartridge 42 being forced out unless the push-button 40 is deliberately depressed. Furthermore, the use of the leaf spring 146 for releasing the pop-up arm 70 and the main frame 22 from the latched state by forcing up the arm 70 will make the following possible. That is, after forcing out the cartridge 42 with the subframe 24 open, the pop-up arm 70 may be latched again to the cocked position by only inserting the cartridge 42 as it is without requiring any other operations, thus enabling us to locate the cartridge 42 correctly in the working position, and thence immediately to close the subframe 24 and the doors 32 and 38 for starting the apparatus.

What we claim is:

1. A flexible disk drive apparatus in which a flexible disk cartridge containing a flexible magnetic disk is inserted, whereby information is recorded and/or reproduced in and/or from said disk, comprising:
   a main frame;
   disk driving means attached to said main frame;
   a subframe attached to said main frame for movement between a disk driving position and a cartridge inserting position;
   selective clamp means on said subframe and operable to engage said disk driving means whereby said disk is engaged with said disk driving means when said subframe is in said disk driving position, said clamp means being spaced from said disk driving means and said engagement is released when said subframe is in said cartridge inserting position;
   ejector means for ejecting said cartridge from said drive apparatus, said ejector means engaging one edge of said cartridge and movable from a released position to a cocked position and including means to latch said ejector means in said cocked position when said cartridge is fully inserted into said drive apparatus; and
   releasing means engageable with said ejector means upon movement of said subframe from said disk driving positon toward said cartridge inserting position to release said ejector means from its latched state, whereby said ejector means moves from said cocked position to said released position to eject said cartridge as said subframe moves from said disk driving position to said cartridge inserting position, said releasing means allowing said ejector means to be latched again in said cocked position in response to the insertion of said cartridge after said subframe has reached said cartridge inserting position.

2. A flexible disk drive apparatus according to claim 1, wherein said subframe is rotatably mounted on said main frame.

3. A flexible disk drive apparatus according to claim 2, wherein said selective clamp means is attached to said subframe.

4. A flexible disk drive apparatus according to claim 3 further comprising a means for urging said subframe toward said cartridge inserting position.

5. A flexible disk drive apparatus according to claim 4 further comprising a means for latching said subframe to said disk driving position.

6. A flexible disk drive apparatus according to claim 5 further comprising a door means connected with said subframe and forming a passage to allow the insertion of said cartridge only when said subframe is in said cartridge inserting position.

7. A flexible disk drive apparatus according to claim 6, wherein said latch means is attached to said door means.

8. A flexible disk drive apparatus according to claim 1, wherein said ejector means includes an elongated ejector member supported by said main frame, said member being capable of moving in the inserting direction of said cartridge.

9. A flexible disk drive apparatus according to claim 8, wherein said ejector means has a projection engaging the edge of said cartridge.

10. A flexible disk drive apparatus according to claim 9 further comprising a means for urging said ejector member toward said released position.

11. A flexible disk drive apparatus according to claim 10, wherein said means for latching said ejector member is a stepped portion formed in said ejector member to engage said main frame when said ejector member is in said cocked position.

12. A flexible disk drive apparatus according to claim 11, wherein said releasing means includes a leaf spring member connected to said subframe, the tip end of said leaf spring member hitting against the surface of said ejector member formed with said stepped portion as said subframe moves from said disk driving position to said cartridge inserting position, thereby releasing the engagement between said stepped portion and said main frame.

13. A flexible disk drive apparatus according to claim 12, wherein said ejector member has a notch into which the tip end of said leaf spring member penetrates when said subframe is in said cartridge inserting position and said ejectr member is in said released position.

14. A flexible disk drive apparatus according to claim 13, wherein said ejector member has a pressing surface so formed as to engage the side face of said leaf spring member to bend said leaf spring member when said cartridge is inserted.

* * * * *